(12) United States Patent
Holcomb et al.

(10) Patent No.: US 8,085,844 B2
(45) Date of Patent: Dec. 27, 2011

(54) SIGNALING REFERENCE FRAME DISTANCES

(75) Inventors: Thomas W. Holcomb, Bothell, WA (US); Kunal Mukerjee, Redmond, WA (US); Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1289 days.

(21) Appl. No.: 10/990,236

(22) Filed: Nov. 15, 2004

(65) Prior Publication Data

US 2005/0111547 A1  May 26, 2005

Related U.S. Application Data

(63) Continuation-in-part of application No. 10/934,905, filed on Sep. 2, 2004, and a continuation-in-part of application No. 10/857,473, filed on May 27, 2004, application No. 10/990,236, filed on Nov. 15, 2004, which is a continuation-in-part of application No. 10/882,135, filed on Jun. 29, 2004.

(60) Provisional application No. 60/501,081, filed on Sep. 7, 2003.

(51) Int. Cl.
*H04N 7/32* (2006.01)
*H04N 7/26* (2006.01)
*H04N 7/50* (2006.01)

(52) U.S. Cl. ......... 375/240.14; 375/240.12; 375/240.13; 375/240.23; 375/240.25

(58) Field of Classification Search ............. 375/240.12, 375/240.14, 240.16, 240.13, 240.23
See application file for complete search history.

(56) References Cited

U.S. PATENT DOCUMENTS

| | | | |
|---|---|---|---|
| 4,838,685 A | 6/1989 | Martinez et al. | |
| 4,989,087 A | 1/1991 | Pele et al. | |
| 5,049,991 A | 9/1991 | Niihara | |
| 5,093,720 A | 3/1992 | Krause et al. | |
| 5,175,618 A | 12/1992 | Ueda et al. | |
| 5,214,504 A | 5/1993 | Toriu et al. | |
| 5,227,878 A | 7/1993 | Puri | |
| 5,255,090 A | 10/1993 | Israelsen | |
| 5,267,334 A | 11/1993 | Normille et al. | |

(Continued)

FOREIGN PATENT DOCUMENTS

EP   0579319   1/1994

(Continued)

OTHER PUBLICATIONS

Poulin, M. et al. _Digital Television Fundamentals_. New York: McGraw-Hill, Jun. 2000. pp. 393-394.*

(Continued)

*Primary Examiner* — David Czekaj
*Assistant Examiner* — David N Werner
(74) *Attorney, Agent, or Firm* — Klarquist Sparkman, LLP

(57) ABSTRACT

Techniques and tools for signaling reference frame distances are described. For example, a video encoder signals a code for a reference frame distance for a current field-coded interlaced video frame. The code indicates a count of frames (e.g., bi-directionally predicted frames) between the current frame and a preceding reference frame. The code may be a variable length code signaled in the frame header for the current frame. The encoder may selectively signal the use of a default value for reference frame distances rather than signal a reference frame distance per frame. A video decoder performs corresponding parsing and decoding.

19 Claims, 18 Drawing Sheets

| Reference Frame Distance | Codeword (Binary) | Codeword Size |
|---|---|---|
| 0 | 00 | 2 |
| 1 | 01 | 2 |
| 2 | 10 | 2 |
| N | 11[(N-3) 1s]0 | N |

U.S. PATENT DOCUMENTS

| | | | |
|---|---|---|---|
| 5,317,397 A | 5/1994 | Odaka et al. | |
| 5,376,968 A | 12/1994 | Wu et al. | |
| 5,412,430 A | 5/1995 | Nagata | |
| 5,412,435 A * | 5/1995 | Nakajima | 348/699 |
| 5,424,779 A | 6/1995 | Odaka et al. | |
| RE35,093 E | 11/1995 | Wang et al. | |
| 5,467,136 A | 11/1995 | Odaka et al. | |
| 5,469,226 A | 11/1995 | David et al. | |
| 5,477,272 A | 12/1995 | Zhang et al. | |
| 5,481,310 A | 1/1996 | Hibi | |
| 5,539,663 A | 7/1996 | Agarwal | |
| 5,541,594 A | 7/1996 | Huang et al. | |
| 5,543,847 A | 8/1996 | Kato | |
| 5,546,129 A | 8/1996 | Lee | |
| 5,557,684 A | 9/1996 | Wang et al. | |
| 5,579,430 A | 11/1996 | Grill et al. | |
| 5,592,226 A | 1/1997 | Lee et al. | |
| 5,594,504 A | 1/1997 | Ebrahimi | |
| 5,598,215 A | 1/1997 | Watanabe | |
| 5,598,216 A | 1/1997 | Lee | |
| 5,612,743 A | 3/1997 | Lee | |
| 5,612,744 A | 3/1997 | Lee | |
| 5,617,145 A | 4/1997 | Huang et al. | |
| 5,619,281 A | 4/1997 | Jung | |
| 5,621,660 A | 4/1997 | Chaddha et al. | |
| 5,627,591 A | 5/1997 | Lee | |
| 5,642,166 A | 6/1997 | Shin et al. | |
| 5,668,608 A | 9/1997 | Lee | |
| 5,673,339 A | 9/1997 | Lee | |
| 5,692,063 A | 11/1997 | Lee et al. | |
| 5,699,476 A | 12/1997 | Van Der Meer | |
| 5,714,952 A | 2/1998 | Wada | |
| 5,731,850 A | 3/1998 | Maturi et al. | |
| 5,740,310 A | 4/1998 | De Haan et al. | |
| 5,742,344 A | 4/1998 | Odaka et al. | |
| 5,748,121 A | 5/1998 | Romriell | |
| 5,751,360 A * | 5/1998 | Tanaka | 375/240.15 |
| 5,754,233 A | 5/1998 | Takashima | |
| 5,784,107 A | 7/1998 | Takahashi | |
| 5,784,175 A | 7/1998 | Lee | |
| 5,784,528 A * | 7/1998 | Yamane et al. | 386/112 |
| 5,822,541 A | 10/1998 | Nonomura et al. | |
| 5,825,421 A | 10/1998 | Tan | |
| 5,835,144 A | 11/1998 | Matsumura et al. | |
| 5,835,149 A | 11/1998 | Astle | |
| RE36,015 E | 12/1998 | Iu | |
| 5,852,664 A | 12/1998 | Iverson et al. | |
| 5,861,919 A | 1/1999 | Perkins et al. | |
| 5,867,230 A | 2/1999 | Wang et al. | |
| 5,870,148 A | 2/1999 | Lillevold | |
| 5,880,784 A | 3/1999 | Lillevold | |
| 5,905,542 A * | 5/1999 | Linzer | 348/699 |
| 5,946,043 A | 8/1999 | Lee et al. | |
| 5,949,489 A | 9/1999 | Nishikawa et al. | |
| 5,963,258 A | 10/1999 | Nishikawa et al. | |
| 5,970,173 A | 10/1999 | Lee et al. | |
| 5,970,175 A | 10/1999 | Nishikawa et al. | |
| 5,982,438 A | 11/1999 | Lin et al. | |
| 5,986,713 A | 11/1999 | Odaka et al. | |
| 5,990,960 A | 11/1999 | Murakami et al. | |
| 5,991,447 A * | 11/1999 | Eifrig et al. | 382/236 |
| 6,002,439 A | 12/1999 | Murakami et al. | |
| 6,002,440 A | 12/1999 | Dalby et al. | |
| RE36,507 E | 1/2000 | Iu | |
| 6,011,596 A | 1/2000 | Burl et al. | |
| 6,026,195 A | 2/2000 | Eifrig et al. | |
| 6,029,126 A | 2/2000 | Malvar | |
| 6,052,150 A | 4/2000 | Kikuchi | |
| 6,052,417 A * | 4/2000 | Fujiwara et al. | 375/240.12 |
| 6,057,832 A | 5/2000 | Lev et al. | |
| 6,097,759 A | 8/2000 | Murakami et al. | |
| 6,104,754 A | 8/2000 | Chujoh et al. | |
| 6,104,757 A * | 8/2000 | Rhee | 375/240.12 |
| 6,122,321 A | 9/2000 | Sazzad et al. | |
| 6,188,794 B1 | 2/2001 | Nishikawa et al. | |
| 6,243,497 B1 | 6/2001 | Chiang et al. | |
| 6,249,318 B1 | 6/2001 | Girod et al. | |
| 6,307,973 B2 | 10/2001 | Nishikawa et al. | |
| 6,324,216 B1 | 11/2001 | Igarashi et al. | |
| 6,370,276 B2 | 4/2002 | Boon | |
| 6,373,895 B2 | 4/2002 | Saunders et al. | |
| 6,400,990 B1 | 6/2002 | Silvian | |
| 6,408,029 B1 | 6/2002 | McVeigh et al. | |
| 6,415,055 B1 * | 7/2002 | Kato | 382/236 |
| 6,415,326 B1 | 7/2002 | Gupta et al. | |
| 6,441,754 B1 | 8/2002 | Wang et al. | |
| 6,499,060 B1 | 12/2002 | Wang et al. | |
| 6,625,215 B1 | 9/2003 | Faryar et al. | |
| 6,640,145 B2 | 10/2003 | Hoffberg et al. | |
| 6,704,360 B2 | 3/2004 | Haskell et al. | |
| 6,912,584 B2 | 6/2005 | Wang et al. | |
| 7,006,881 B1 | 2/2006 | Hoffberg et al. | |
| 7,242,716 B2 * | 7/2007 | Koto et al. | 375/240.16 |
| 7,512,698 B1 | 3/2009 | Pawson | |
| 7,545,863 B1 | 6/2009 | Haskell et al. | |
| 2002/0034256 A1 * | 3/2002 | Talluri et al. | 375/240.27 |
| 2002/0113898 A1 | 8/2002 | Mitsuhashi | |
| 2002/0114391 A1 * | 8/2002 | Yagasaki et al. | 375/240.14 |
| 2002/0126754 A1 * | 9/2002 | Shen et al. | 375/240.12 |
| 2003/0099292 A1 * | 5/2003 | Wang et al. | 375/240.12 |
| 2003/0138150 A1 | 7/2003 | Srinivasan | |
| 2003/0156648 A1 | 8/2003 | Holcomb et al. | |
| 2003/0202586 A1 * | 10/2003 | Jeon | 375/240.12 |
| 2004/0013308 A1 * | 1/2004 | Jeon et al. | 382/236 |
| 2004/0066848 A1 * | 4/2004 | Jeon | 375/240.15 |
| 2004/0131267 A1 | 7/2004 | Adiletta et al. | |
| 2004/0233992 A1 * | 11/2004 | Base et al. | 375/240.18 |
| 2005/0123274 A1 * | 6/2005 | Crinon et al. | 386/69 |
| 2005/0135484 A1 | 6/2005 | Lee et al. | |
| 2005/0147167 A1 | 7/2005 | Dumitras et al. | |
| 2005/0193311 A1 | 9/2005 | Das et al. | |
| 2006/0210181 A1 | 9/2006 | Wu et al. | |
| 2007/0009044 A1 * | 1/2007 | Tourapis et al. | 375/240.25 |
| 2007/0205928 A1 | 9/2007 | Chujoh et al. | |

FOREIGN PATENT DOCUMENTS

| | | | |
|---|---|---|---|
| EP | 0612156 | 4/1994 | |
| EP | 0614318 | 9/1994 | |
| EP | 0707425 | 10/1994 | |
| EP | 0625853 | 11/1994 | |
| JP | 5130595 | 5/1993 | |
| JP | 6030394 | 2/1994 | |
| JP | 6078298 | 3/1994 | |
| JP | 10164600 | 6/1998 | |
| JP | 11150731 | 6/1999 | |
| JP | 2000152247 | 5/2000 | |
| WO | WO 91/11782 | 8/1991 | |
| WO | WO 97/05746 | 2/1997 | |
| WO | WO 0135650 A1 * | 5/2001 | |

OTHER PUBLICATIONS

Borgwardt, P. "Core Experiment on Interlaced Video Coding", ITU Video Coding Experts Group (VCEG) 14th Meeting (Oct. 29, 2001).*

Tourapis, A.M., Wu, F., and Li, S. "Timestamp Independent Motion Vector Prediction for P and B frames with Division Elimination", presented as document JVT-D040 at JVT 4th Meeting, Klagenfurt, Austria, Jul. 22-26, 2002.*

S.W. Golomb, "Run-Length Encodings", 12 IEEE Trans. on Info. Theory 399-401 (Jul. 1966).*

"DivX Multi Standard Video Encoder," 2 pp. (Downloaded from the World Wide Web on Jan. 24, 2006).

ISO/IEC JTC1/SC29/WG11, N2459, "Overview of the MPEG-4 Standard," (Oct. 1998).

ISO, ISO/IEC JTC1/SC29/WG11 MPEG 97/N1642, "MPEG-4 Video Verification Model Version 7.0 3. Encoder Definition," pp. 1, 17-122, Bristol (Apr. 1997).

ITU-T, Draft Recommendation H.263, "Video Coding for Low Bitrate Communication," 51 pp. (Dec. 1995).

Kim et al., "Low-Complexity Macroblock Mode Selection for H.264/AVC Encoders," *IEEE Int. Conf. on Image Processing*, 4 pp. (Oct. 2004).

Le Gall, "MPEG: A Video Compression Standard for Multimedia Applications," *Communications of the ACM*, vol. 34, No. 4, pp. 47-58 (Apr. 1991).

Sullivan et al., "The H.264/AVC Advanced Video Coding Standard: Overview and Introduction to the Fidelity Range Extensions," 21 pp. (Aug. 2004).

Wiegand et al., "Fast Search for Long-Term Memory Motion-Compensated Prediction," *Proc. ICIP*, vol. 3, pp. 619-622 (Oct. 1998).

Wien, "Variable Block-Size Transforms for Hybrid Video Coding," Dissertation, 182 pp. (Feb. 2004).

Joint Video Team (JVT) of ISO/IEC MPEG & ITU-T VCEG, "Joint Final Committee Draft (JFCD) of Joint Video Specification," JVT-D157, 207 pp. (Aug. 2002).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 2002) [Downloaded from the World Wide Web on Aug. 8, 2003].

ISO/IEC, 11172-2, "Information Technology—Coding of Moving Pictures and Associated Audio for Digital Storage Media at up to about 1.5 Mbit/s—Part 2: Video," pp. 112 pp. (Aug. 1993).

ISO/IEC, "JTC1/SC29/WG11 N2202, Information Technology—Coding of Audio-Visual Objects: Visual, ISO/IEC 14496-2," 329 pp. (Mar. 1998).

ITU-T, "ITU-T Recommendation H.261, video Codec for Audiovisual Services at p × 64 kbits," 25 pp. (Mar. 1993).

ITU-T, "ITU-T Recommendation H.262, Information Technology—Generic Coding of Moving Pictures and Associated Audio Information: Video," 205 pp. (Jul. 1995).

ITU-T, "ITU-T Recommendation H.263 Video Coding for Low Bit Rate Communication," 162 pp. (Feb. 1998).

Microsoft Corporation, "Windows Media Technologies: Overview—Technical White Paper," pp. 1-16 (month unknown, 1998).

Sullivan, "Draft for 'H.263++' Annexes U, V, and W to Recommendation H.263," ITU-T, Study Group 16, Question 15, 46 pp. (Nov. 2000).

Wiegand et al., "Block-Based Hybrid Coding Using Motion Compensated Long-Term Memory Prediction," *Picture Coding Symposium*, No. 143, pp. 153-158 (Sep. 1997).

Wiegand et al., "Motion-Compensating Long-Term Memory Prediction," *Proc. ICIP*, vol. 2, pp. 53-56 (Oct. 1997).

Wiegand, *Multi-frame Motion-Compensated Prediction for Video Transmissions*, Shaker Verlag, 141 pp. (Sep. 2001).

Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).

* cited by examiner

Software 180 implementing video encoder and/or decoder that operates with reference frame distance signaling

| Reference Frame Distance | Codeword (Binary) | Codeword Size |
|---|---|---|
| 0 | 00 | 2 |
| 1 | 01 | 2 |
| 2 | 10 | 2 |
| N | 11[(N-3) 1s]0 | N |

Top field ▨
Bottom field ▪

Top field ▨
Bottom field ▪

Top field ▨
Bottom field ▪

Figure 8A

| FCM | Picture Coding Type |
|---|---|
| 0 | Progressive |
| 10 | Frame-Interlace |
| 11 | Field-Interlace |

Figure 8B

| FPTYPE FLC | First Field Picture Type | Second Field Picture Type |
|---|---|---|
| 000 | I | I |
| 001 | I | P |
| 010 | P | I |
| 011 | P | P |
| 100 | B | B |
| 101 | B | BI |
| 110 | BI | B |
| 111 | BI | BI |

Figure 8C

| BFRACTION VLC | Fraction | BFRACTION VLC | Fraction |
|---|---|---|---|
| 000 | 1/2 | 1110101 | 2/7 |
| 001 | 1/3 | 1110110 | 3/7 |
| 010 | 2/3 | 1110111 | 4/7 |
| 011 | 1/4 | 1111000 | 5/7 |
| 100 | 3/4 | 1111001 | 6/7 |
| 101 | 1/5 | 1111010 | 1/8 |
| 110 | 2/5 | 1111011 | 3/8 |
| 1110000 | 3/5 | 1111100 | 5/8 |
| 1110001 | 4/5 | 1111101 | 7/8 |
| 1110010 | 1/6 | 1111110 | Invalid |
| 1110011 | 5/6 | 1111111 | BI |
| 1110100 | 1/7 | | |

Figure 9A

```
samecount = 0;
oppositecount = 0;
if (predictorA is not out of bounds) {
   if (predictorC is not out of bounds) {
      if (predictorA is intra) {
         samefieldpred_x = oppositefieldpred_x = samefieldpredA_x = oppositefieldpredA_x = 0
         samefieldpred_y = oppositefieldpred_y = samefieldpredA_y = oppositefieldpredA_y = 0
      }
      if (predictorB is intra) {
         samefieldpred_x = oppositefieldpred_x = samefieldpredB_x = oppositefieldpredB_x = 0
         samefieldpred_y = oppositefieldpred_y = samefieldpredB_y = oppositefieldpredB_y = 0
      }
      if (predictorC is intra) {
         samefieldpred_x = oppositefieldpred_x = samefieldpredC_x = oppositefieldpredC_x = 0
         samefieldpred_x = oppositefieldpred_x = samefieldpredC_y = oppositefieldpredC_y = 0
      }
      if (predictorA is not intra) {
         if (predictorA is from same field) {
            samecount = samecount + 1
            samefieldpred_x  = samefieldpredA_x = predictorA_x
            samefieldpred_y  = samefieldpredA_y = predictorA_y
            oppositefieldpred_x = oppositefieldpredA_x = scaleforopposite_x(predictorA_x)
            oppositefieldpred_y = oppositefieldpredA_y = scaleforopposite_y(predictorA_y)
         }
         else {
            oppositecount = oppositecount + 1
            oppositefieldpred_x  = oppositefieldpredA_x = predictorA_x
            oppositefieldpred_y  = oppositefieldpredA_y = predictorA_y
            samefieldpred_x = samefieldpredA_x = scaleforsame_x(predictorA_x)
            samefieldpred_y = samefieldpredA_y = scaleforsame_y(predictorA_y)
         }
      }
      if (predictorB is not intra) {
         If (predictorB is from same field) {
            samecount = samecount + 1
            samefieldpred_x = samefieldpredB_x = predictorB_x
            samefieldpred_y = samefieldpredB_y = predictorB_y
            oppositefieldpred_x = oppositefieldpredB_x = scaleforopposite_x(predictorB_x)
            oppositefieldpred_y = oppositefieldpredB_y = scaleforopposite_y(predictorB_y)
         }
``` continued in 9B continued from 9A  Figure 9B

```
    else {
      oppositecount = oppositecount + 1
      oppositefieldpred_x = oppositefieldpredB_x = predictorB_x
      oppositefieldpred_y = oppositefieldpredB _y = predictorB_y
      samefieldpred_x = samefieldpredB_x = scaleforsame_x(predictorB_x)
      samefieldpred_y = samefieldpredB_y = scaleforsame_y(predictorB_y)
    }
  }
  if (predictorC is not intra) {
    if (predictorC is from same field) {
      samecount = samecount + 1
      samefieldpred_x = samefieldpredC_x = predictorC_x
      samefieldpred_y = samefieldpredC_y = predictorC_y
      oppositefieldpred_x = oppositefieldpredC_x = scaleforopposite_x(predictorC_x)
      oppositefieldpred_y = oppositefieldpredC_y = scaleforopposite_y(predictorC_y)
    }
    else {
      oppositecount = oppositecount + 1
      oppositefieldpred_x  = oppositefieldpredC_x = predictorC_x
      oppositefieldpred_y = oppositefieldpredC _y = predictorC_y
      samefieldpred_x = samefieldpredC _x = scaleforsame_x(predictorC_x)
      samefieldpred_y = samefieldpredC _y = scaleforsame_y(predictorC_y)
    }
  }
  if ((samecount + oppositecount) > 1) {
    samefieldpred_x = median (samefieldpredA_x, samefieldpredB_x, samefieldpredC_x)
    samefieldpred_y = median (samefieldpredA_y, samefieldpredA_y, samefieldpredC_y)
    oppositefieldpred_x = median (oppositefieldpredA_x, oppositefieldpredB_x, oppositefieldpredC_x)
    oppositefieldpred_y = median (oppositefieldpredA_y, oppositefieldpredB_y, oppositefieldpredC_y)
  } if (samecount > oppositecount)
    dominantpredictor = samefield
  else
    dominantpredictor = oppositefield
}
``` continued in 9C

Figure 9C  continued from 9B

```
else {
  // predictorC is out of bounds
  if (only 1 macroblock per row) {
    if (predictorA is intra) {
      samefieldpred_x = oppositefieldpred_x = 0
      samefieldpred_y = oppositefieldpred_y = 0
      dominantpredictor = oppositefield
    }
    else {
      // Use predictorA
      if (predictorA is from same field) {
        samefieldpred_x = predictorA_x
        samefieldpred_y = predictorA_y
        oppositefieldpred_x = scaleforopposite_x(predictorA_x)
        oppositefieldpred_y = scaleforopposite_y(predictorA_y)
        dominantpredictor = samefield
      }
      else {
        oppositefieldpred_x = predictorA_x
        oppositefieldpred_y = predictorA_y
        samefieldpred_x = scaleforsame_x(predictorA_x)
        samefieldpred_y = scaleforsame_y(predictorA_y)
        dominantpredictor = oppositefield
      }
    }
  }
  else {
    // Predictor C is out of bounds, use Predictor and PredictorB
    predictorC_x = 0
    predictorC_y = 0
    if (predictorA is intra) {
      samefieldpred_x = oppositefieldpred_x = samefieldpredA_x = oppositefieldpredA_x = 0
      samefieldpred_y = oppositefieldpred_y = samefieldpredA_y = oppositefieldpredA_y = 0
    }
    if (predictorB is intra) {
      samefieldpred_x = oppositefieldpred_x = samefieldpredB_x = oppositefieldpredB_x = 0
      samefieldpred_y = oppositefieldpred_y = samefieldpredB_y = oppositefieldpredB_y = 0
    }
``` continued in 9D

Figure 9D continued from 9C

```
if (predictorC is intra) {
    samefieldpred_x = oppositefieldpred_x = samefieldpredC_x = oppositefieldpredC_x = 0
    samefieldpred_x = oppositefieldpred_x = samefieldpredC_y = oppositefieldpredC_y = 0
}
if (predictorA is not intra) {
    if (predictorA is from same field) {
        samecount = samecount + 1
        samefieldpred_x = samefieldpredA_x = predictorA_x
        samefieldpred_y = samefieldpredA_y = predictorA_y
        oppositefieldpred_x = oppositefieldpredA_x = scaleforopposite_x(predictorA_x)
        oppositefieldpred_y = oppositefieldpredA_y = scaleforopposite_y(predictorA_y)
    }
    else {
        oppositecount = oppositecount + 1
        oppositefieldpred_x = oppositefieldpredA_x = predictorA_x
        oppositefieldpred_y = oppositefieldpredA _y = predictorA_y
        samefieldpred_x = samefieldpredA_x = scaleforsame_x(predictorA_x)
        samefieldpred_y = samefieldpredA_y = scaleforsame_y(predictorA_y)
    }
}
if (predictorB is not intra) {
    if (predictorB is from same field) {
        samecount = samecount + 1
        samefieldpred_x = samefieldpredB_x = predictorB_x
        samefieldpred_y = samefieldpredB_y = predictorB_y
        oppositefieldpred_x = oppositefieldpredB_x = scaleforopposite_x(predictorB_x)
        oppositefieldpred_y = oppositefieldpredB_y = scaleforopposite_y(predictorB_y)
    }
    else {
        oppositecount = oppositecount + 1
        oppositefieldpred_x = oppositefieldpredB_x = predictorB_x
        oppositefieldpred_y = oppositefieldpredB_y = predictorB_y
        samefieldpred_x = samefieldpredB_x = scaleforsame_x(predictorB_x)
        samefieldpred_y = samefieldpredB_y = scaleforsame_y(predictorB_y)
    }
}
``` continued in 9E continued from 9D Figure 9E

```
            if ((samecount + oppositecount) > 1) {
                samefieldpred_x = median (samefieldpredA_x, samefieldpredB_x, samefieldpredC_x)
                samefieldpred_y = median (samefieldpredA_y, samefieldpredA_y, samefieldpredC_y)
                oppositefieldpred_x = median (oppositefieldpredA_x, oppositefieldpredB_x,
oppositefieldpredC_x)
                oppositefieldpred_y = median (oppositefieldpredA_y, oppositefieldpredB_y,
oppositefieldpredC_y)
            }
            if (samecount > oppositecount)
                dominantpredictor = samefield
            else
                dominantpredictor = oppsositefield
        }
    }
}
else {
    // Predictor A is out of bounds
    if (predictorC is out of bounds) {
        samefieldpred_x = oppositefieldpred_x = 0
        samefieldpred_y = oppositefieldpred_y = 0
        dominantpredictor = oppositefield
    }
    else {
        // Use predictorC
        if (predictorC is from same field) {
            samefieldpred_x = predictorC_x
            samefieldpred_y = predictorC_y
            oppositefieldpred_x = scaleforopposite_x(predictorC_x)
            oppositefieldpred_y = scaleforopposite_y(predictorC_y)
            dominantpredictor = samefield
        }
        else {
            oppositefieldpred_x = predictorC_x
            oppositefieldpred_y = predictorC_y
            samefieldpred_x = scaleforsame_x(predictorC_x)
            samefieldpred_y = scaleforsame_y(predictorC_y)
            dominantpredictor = oppositefield
        }
    }
}
```

Figure 9F

```
scaleforopposite_x (n) {
        int scaledvalue
        scaledvalue = (n * SCALEOPP) >> 8
        return scaledvalue
} scaleforopposite_y (n) {
        int scaledvalue
        if (current field is top)
                scaledvalue = ((n * SCALEOPP) >> 8) – 2
        else  //current field is bottom
                scaledvalue = ((n * SCALEOPP) >> 8) + 2
        return scaledvalue
} scaleforsame_x (n) {
        if (abs (n) < SCALEZONE1_X)
                scaledvalue = (n * SCALESAME1) >> 8
        else {
                if (n < 0)
                        scaledvalue = ((n * SCALESAME2) >> 8) – ZONE1OFFSET_X
                else
                        scaledvalue = ((n * SCALESAME2) >> 8) + ZONE1OFFSET_X
        }
        return scaledvalue
}
```

Figure 9G

```
scaleforsame_y (n) {
    if (current field is top) {
    if (abs (n) < SCALEZONE1_Y)
            scaledvalue = (n * SCALESAME1) >> 8
    else {
            if (n < 0)
                    scaledvalue = ((n * SCALESAME2) >> 8) - ZONE1OFFSET_Y
            else
                    scaledvalue = ((n * SCALESAME2) >> 8) + ZONE1OFFSET_Y
        }
    }
    else {   //current field is bottom
    if (abs (n) < SCALEZONE1_Y)
            scaledvalue = (n * SCALESAME1) >> 8
    else {
            if (n < 0)
                    scaledvalue = ((n * SCALESAME2) >> 8) - ZONE1OFFSET_Y
            else
                    scaledvalue = ((n * SCALESAME2) >> 8) + ZONE1OFFSET_Y
        }
    }
    return scaledvalue
}
```

Figure 9H

P-Field MV Predictor Scaling Values When Current Field Is First

|  | REFDIST + 1 | | | |
| --- | --- | --- | --- | --- |
|  | 1 | 2 | 3 | 4 or greater |
| SCALEOPP | 128 | 192 | 213 | 224 |
| SCALESAME1 | 512 | 341 | 307 | 293 |
| SCALESAME2 | 219 | 236 | 242 | 245 |
| SCALEZONE1_X | 32 | 48 | 53 | 56 |
| SCALEZONE1_Y | 8 | 12 | 13 | 14 |
| ZONE1OFFSET_X | 37 | 20 | 14 | 11 |
| ZONE1OFFSET_Y | 10 | 5 | 4 | 3 |

Figure 9I

P-Field MV Predictor Scaling Values When Current Field Is Second

|  | REFDIST + 1 | | | |
| --- | --- | --- | --- | --- |
|  | 1 | 2 | 3 | 4 or greater |
| SCALEOPP | 128 | 64 | 43 | 32 |
| SCALESAME1 | 512 | 1024 | 1536 | 2048 |
| SCALESAME2 | 219 | 204 | 200 | 198 |
| SCALEZONE1_X | 32 | 16 | 11 | 8 |
| SCALEZONE1_Y | 8 | 4 | 3 | 2 |
| ZONE1OFFSET_X | 37 | 52 | 56 | 11 |
| ZONE1OFFSET_Y | 10 | 5 | 4 | 3 |

Figure 10A

```
scaleforopposite_x (n) {
        if (abs (n) < SCALEZONE1_X)
                scaledvalue = (n * SCALEOPP1) >> 8
        else {
                if (n < 0)
                        scaledvalue = ((n * SCALEOPP2) >> 8) - ZONE1OFFSET_X
                else
                        scaledvalue = ((n * SCALEOPP2) >> 8) + ZONE1OFFSET_X
        }
        return scaledvalue
} scaleforopposite_y (n) {
        if (current field is top) {
        if (abs (n) < SCALEZONE1_Y)
                scaledvalue = (n * SCALEOPP1) >> 8
        else {
                if (n < 0)
                        scaledvalue = ((n * SCALEOPP2) >> 8) - ZONE1OFFSET_Y
                else
                        scaledvalue = ((n * SCALEOPP2) >> 8) + ZONE1OFFSET_Y
        }
    }
        else {    //current field is bottom
        if (abs (n) < SCALEZONE1_Y)
                scaledvalue = (n * SCALEOPP1) >> 8
        else {
                if (n < 0)
                        scaledvalue = ((n * SCALEOPP2) >> 8) - ZONE1OFFSET_Y
                else
                        scaledvalue = ((n * SCALEOPP2) >> 8) + ZONE1OFFSET_Y
        }
    }
        return scaledvalue
}
```

Figure 10B

```
scaleforsame_x (n) {
    int scaledvalue
    scaledvalue = (n * SCALESAME) >> 8
    return scaledvalue
} scaleforsame_y (n) {
    int scaledvalue
    if (current field is top)
        scaledvalue = ((n * SCALESAME) >> 8) – 2
    else //current field is bottom
        scaledvalue = ((n * SCALESAME) >> 8) + 2
    return scaledvalue
}
```

Figure 10C

B-Field Backward MV Predictor Scaling Values For When Current Field Is First

|  | REFDIST + 1 | | | |
| --- | --- | --- | --- | --- |
|  | 1 | 2 | 3 | 4 or greater |
| SCALESAME | 171 | 205 | 219 | 228 |
| SCALEOPP1 | 384 | 320 | 299 | 288 |
| SCALEOPP2 | 230 | 239 | 244 | 246 |
| SCALEZONE1_X | 32 | 48 | 53 | 56 |
| SCALEZONE1_Y | 8 | 12 | 13 | 14 |
| ZONE1OFFSET_X | 37 | 20 | 14 | 11 |
| ZONE1OFFSET_Y | 10 | 5 | 4 | 3 | even-numbered
SIGNALING REFERENCE FRAME DISTANCES

RELATED APPLICATION INFORMATION

The present application is a continuation-in-part of U.S. patent application Ser. No. 10/934,905, filed Sep. 2, 2004, which claims the benefit of U.S. Provisional Patent Application No. 60/501,081, filed Sep. 7, 2003. U.S. patent application Ser. No. 10/934,905 is also a continuation-in-part of U.S. patent application Ser. No. 10/857,473, filed May 27, 2004, which claims the benefit of U.S. Provisional Patent Application No. 60/501,081, filed Sep. 7, 2003.

The present application is also a continuation-in-part of U.S. patent application Ser. No. 10/882,135, filed Jun. 29, 2004, which claims the benefit of U.S. Provisional Patent Application No. 60/501,081, filed Sep. 7, 2003.

The disclosures of U.S. patent application Ser. Nos. 10/934,905, 10/857,473, and 10/882,135 and U.S. Provisional Patent Application No. 60/501,081 are hereby incorporated by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

Techniques and tools for encoding and decoding reference frame distances are described. For example, an encoder signals a reference frame distance for a field-coded interlaced video frame.

BACKGROUND

Digital video consumes large amounts of storage and transmission capacity. A typical raw digital video sequence includes 15 or 30 frames per second. Each frame can include tens or hundreds of thousands of pixels (also called pels), where each pixel represents a tiny element of the picture. In raw form, a computer commonly represents a pixel as a set of three samples totaling 24 bits. For instance, a pixel may include an eight-bit luminance sample (also called a luma sample, as the terms "luminance" and "luma" are used interchangeably herein) that defines the grayscale component of the pixel and two eight-bit chrominance samples (also called chroma samples, as the terms "chrominance" and "chroma" are used interchangeably herein) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which the quality of the video does not suffer, but decreases in bit rate are limited by the inherent amount of variability (sometimes called entropy) of the video data. Or, compression can be lossy, in which the quality of the video suffers, but achievable decreases in bit rate are more dramatic. Lossy compression is often used in conjunction with lossless compression—the lossy compression establishes an approximation of information, and the lossless compression is applied to represent the approximation.

In general, video compression techniques include "intra-picture" compression and "inter-picture" compression, where a picture is, for example, a progressively scanned video frame, a frame-coded interlaced video frame (having alternating lines for video fields), or an interlaced video field. Intra-picture compression techniques compress individual pictures (typically called I-pictures or key pictures), and inter-picture compression techniques compress pictures (typically called predicted pictures, P-pictures, or B-pictures) with reference to preceding and/or following pictures (typically called reference or anchor pictures).

Intra-picture compression techniques often use a frequency transform and quantization to exploit spatial redundancy within a picture. For example, an encoder divides an intra-coded picture into 8×8 pixel blocks. To each 8×8 block, the encoder applies a frequency transform, which generates a set of frequency domain (i.e., spectral) coefficients. The resulting spectral coefficients are quantized and entropy encoded. During decoding, a decoder typically performs the inverse of the encoder operations. For example, the decoder performs entropy decoding, inverse quantization, and an inverse frequency transform.

Inter-picture compression techniques often use motion estimation and motion compensation to exploit temporal redundancy between pictures. For example, for motion estimation an encoder divides a current predicted picture into 16×16 macroblocks. For a macroblock of the current picture, a similar area in a reference picture is found for use as a predictor. A motion vector indicates the location of the predictor in the reference picture. In other words, the motion vector for the macroblock of the current picture indicates the displacement between the spatial location of the macroblock in the current picture and the spatial location of the predictor in the reference picture. The encoder computes the sample-by-sample difference between the current macroblock and the predictor to determine a residual (also called error signal). To blocks of the residual, the encoder applies a frequency transform. The resulting spectral coefficients are quantized and entropy encoded. During decoding, a decoder typically performs the inverse of various encoder operations. For example, for a residual, the decoder performs entropy decoding, an inverse quantization, and an inverse frequency transform. The decoder also performs motion compensation and combines the predictors with reconstructed residuals. If an intra-coded or inter-coded picture is used as a reference for subsequent motion compensation, the encoder also reconstructs the picture.

I. Interlaced Video and Progressive Video

A video frame contains lines of spatial information of a video signal. For progressive video, lines of an entire frame are scanned in raster scan fashion (left to right, top to bottom) starting at a single time instant. The lines are successive and non-alternating.

The raster scan of an interlaced video frame is performed in two passes by scanning alternate lines in each pass. For example, the first scan is made up of the even lines of the frame and the second scan is made up of the odd lines of the scan. So, in an interlaced video frame, the even-numbered lines (top field) may be scanned starting at one time (e.g., time t), with the odd-numbered lines (bottom field) scanned starting at a different (typically later) time (e.g., time t+1). This can create jagged tooth-like features in regions of an interlaced video frame where motion is present when the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

II. Motion Vector Prediction in Windows Media Video, Versions 8 and 9

Microsoft Corporation's Windows Media Video, Version 8 ["WMV8"] includes a video encoder and a video decoder. The WMV8 encoder uses intra- and inter-compression, and the WMV8 decoder uses intra- and inter-decompression. Windows Media Video, Version 9 ["WMV9"] uses a similar architecture for many operations.

The WMV8 and WMV9 codecs use motion vector prediction to reduce the bit rate associated with signaling of motion vector information. The value of a motion vector for a current block or macroblock is often correlated with the values of motion vectors for spatially surrounding blocks or macroblocks. Motion vector compression can be achieved by determining or selecting a motion vector predictor from neighboring macroblocks or blocks, and predicting the motion vector for the current macroblock or block using the motion vector predictor. The encoder then encodes the differential between the motion vector and the motion vector predictor. For example, the encoder computes the difference between the horizontal component of the motion vector and the horizontal component of the motion vector predictor, computes the difference between the vertical component of the motion vector and the vertical component of the motion vector predictor, and encodes the differences.

A corresponding decoder uses motion vector prediction when reconstructing the motion vector. For a motion vector, the decoder determines a motion vector predictor from neighboring macroblocks or blocks (as was done in the encoder, using the same contextual information), decodes a differential for the motion vector, and reconstructs the motion vector from the motion vector predictor and differential.

Motion vector prediction in WMV8 and WMV9 varies depending on the location of the current macroblock (or block) in the current picture (e.g., top row, left column, interior) and whether neighbors have motion vectors for blocks or macroblocks. In WMV9, motion vector prediction also varies depending on video picture type (e.g., progressive frame, interlaced frame). Motion vector prediction in WMV8 and WMV9 provides good performance in many cases. Separate coding of fields of interlaced video frames is not supported in WMV8 and WMV9, however, so the motion vector prediction mechanisms in WMV8 and WMV9 do not address the particular requirements of motion vector prediction for separately coded fields.

III. Motion Vector Prediction in Standards

Aside from previous WMV encoders and decoders, several international standards relate to video compression and decompression. These standards include the Motion Picture Experts Group ["MPEG"] 1, 2, and 4 standards and the H.261, H.262 (another name for MPEG 2), H.263, and H.264 standards from the International Telecommunication Union ["ITU"]. Each of these standards specifies some form of motion vector prediction, although the details of the motion vector prediction vary widely between the standards.

Motion vector prediction is simplest in the H.261 standard, for example, in which the motion vector predictor for the motion vector of a current macroblock is generally the motion vector of the previously coded/decoded macroblock. [H.261 standard, section 4.2.3.4.] Motion vector prediction is similar in the MPEG-1 standard. [MPEG-1 standard, sections 2.4.4.2 and D.6.2.3.]

H.262 specifies more complex motion vector prediction. For a given macroblock, motion vector predictors may be tracked for the forward and backward directions for the whole macroblock or for each of the top and bottom halves of the macroblock. [H.262 standard, section 7.6.3.] For a given motion vector, the motion vector predictor is still typically determined from a single neighbor. Even though separate coding of fields of interlaced video frames is supported in H.262, motion vector prediction for such separately coded fields does not effectively account for polarity changes or changes in distance between a current field and reference field(s).

Other standards (such as H.263, MPEG-4, draft JVT-D157 of H.264) determine a motion vector predictor from multiple different neighbors with different candidate motion vector predictors. [H.263 standard, sections 6.1.1; MPEG-4 standard, sections 7.5.5 and 7.6.2; and F.2; JVT-D157, section 8.4.1.] These are efficient for some kinds of motion. Even when separate coding of fields of interlaced video frames is supported, however, motion vector prediction for separately coded fields does not effectively account for polarity changes or changes in distance between the current field and reference field(s).

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for encoding and decoding reference frame distances. The reference frame distances are used, for example, to improve motion vector prediction for separately coded fields of interlaced video frames. The described techniques and tools include, but are not limited to, the following:

A tool such as a video encoder or decoder processes a code for a reference frame distance for a current field-coded interlaced video frame. The code indicates a count of frames between the current frame and a preceding reference frame. The count may be, for example, a count of bi-directionally predicted field-coded interlaced video frames between the current frame and reference frame. Or, the count may be an arbitrary value selected so as to improve the performance of operations that are based on the count.

Or, a tool such as a video encoder or decoder processes a first syntax element that indicates whether reference frame distances for multiple frames are signaled or have a default value. For each of the frames, if reference frame distances are signaled, then the tool processes a second syntax element per frame that indicates a reference frame distance for the frame. On the other hand, if reference frame distances have the default value, then the tool uses the default value.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIGS. 8A-8C are tables of codes in the combined implementation.

FIGS. 9A-9I are pseudocode and tables for motion vector prediction for two-reference field interlaced P-fields in the combined implementation.

FIGS. 10A-10C are pseudocode and a table for scaling operations in motion vector prediction for certain interlaced B-fields in the combined implementation.

DETAILED DESCRIPTION

The present application relates to techniques and tools for encoding and decoding reference frame distance information, along with corresponding signaling techniques for use with a bitstream format or syntax comprising different layers or levels (e.g., sequence, frame, field, slice, macroblock, and/or block).

The various techniques and tools can be used in combination or independently. Different embodiments implement one or more of the described techniques and tools. The techniques and tools described herein can be used in a video encoder or decoder, or in some other system not specifically limited to video encoding or decoding.

I. Computing Environment

Figures 1, 5:
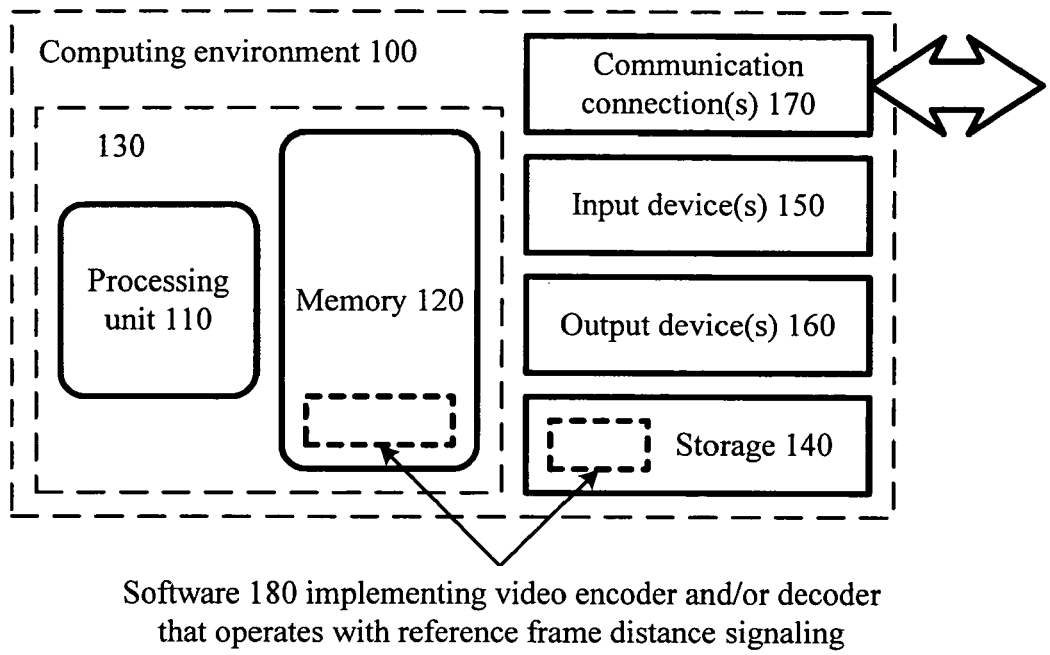
FIG. 1 is a block diagram of a suitable computing environment in conjunction with which several described embodiments may be implemented.
FIG. 5 is a table of codes for signaling reference frame distance information.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing a video encoder or decoder that encodes or decodes reference frame distance information.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the video encoder or decoder.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate," "determine," "predict," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 2:
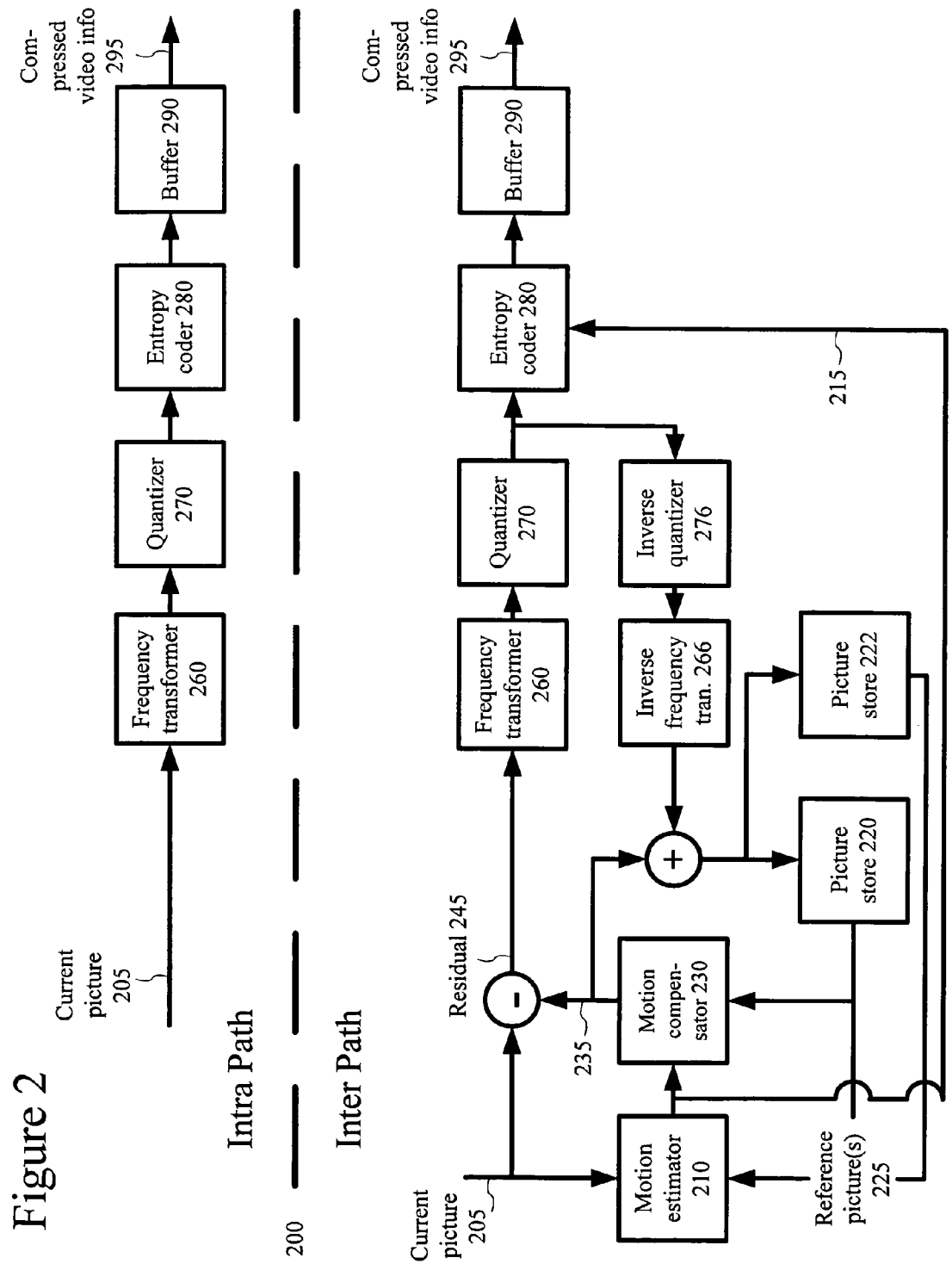
FIGS. 2 and 3 are block diagrams of a generalized video encoder system and a generalized video decoder system, respectively, in conjunction with which several described embodiments may be implemented.
Figure 3:
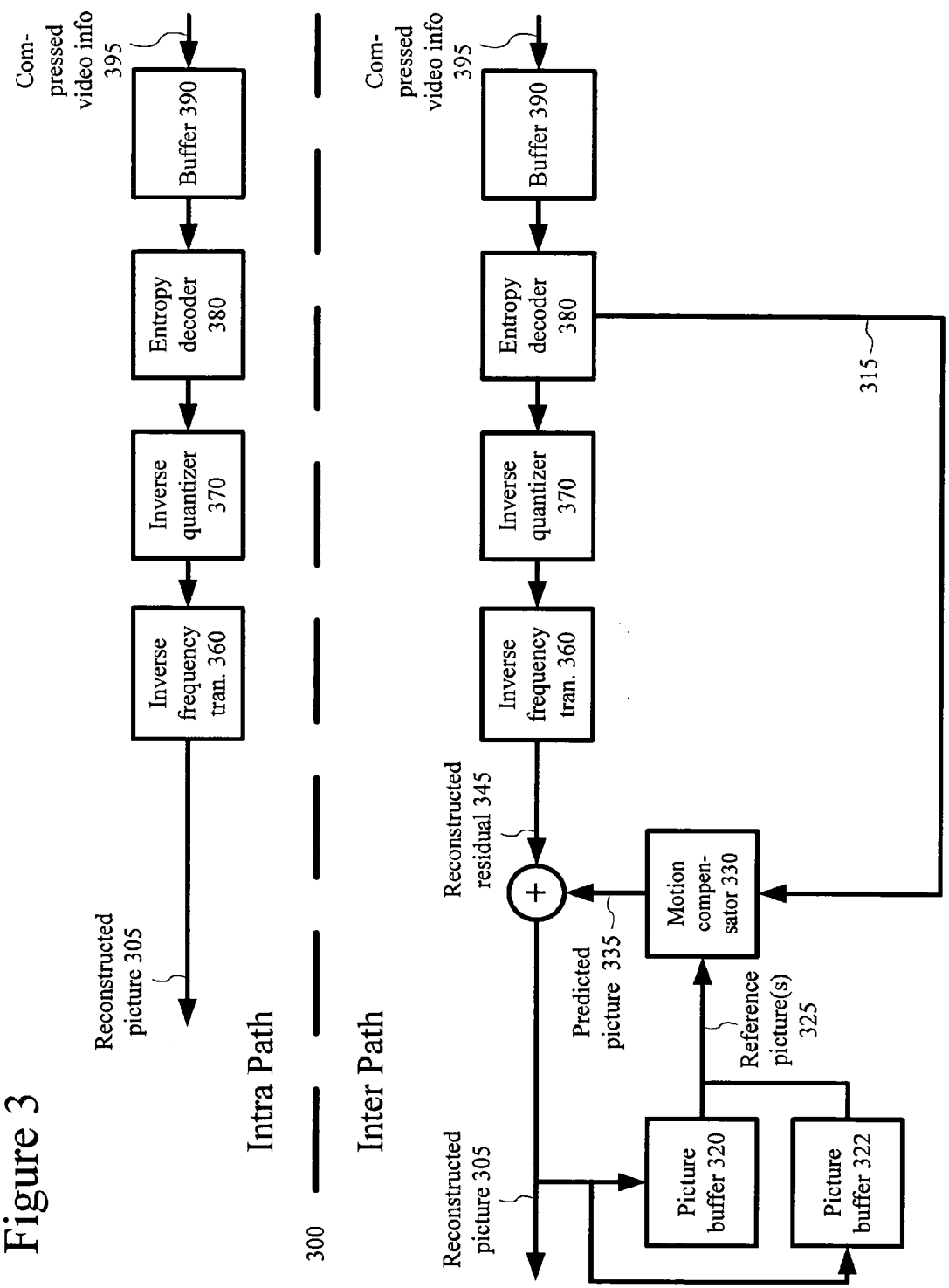

FIG. 2 is a block diagram of a generalized video encoder system (200), and FIG. 3 is a block diagram of a generalized video decoder system (300), in conjunction with which various described embodiments may be implemented.

The relationships shown between modules within the encoder and decoder indicate the main flow of information in the encoder and decoder; other relationships are not shown for the sake of simplicity. In particular, FIGS. 2 and 3 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video version 9 or other format.

The encoder (200) and decoder (300) process video pictures, which may be video frames, video fields or combinations of frames and fields. The bitstream syntax and semantics at the picture and macroblock levels may depend on whether frames or fields are used. There may be changes to macroblock organization and overall timing as well. The encoder (200) and decoder (300) are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in the next section.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder (200) and decoder (300) process video frames organized as follows. A frame contains lines of spatial information of a video signal. For progressive video, these lines contain samples starting from one time instant and continuing through successive lines to the bottom of the frame. A progressive video frame is divided into macroblocks with four 8×8 luminance blocks (Y1 through Y4) and two 8×8 chrominance blocks that are co-located with the four luminance blocks but half resolution horizontally and vertically, following the conventional 4:2:0 macroblock format. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 4A:
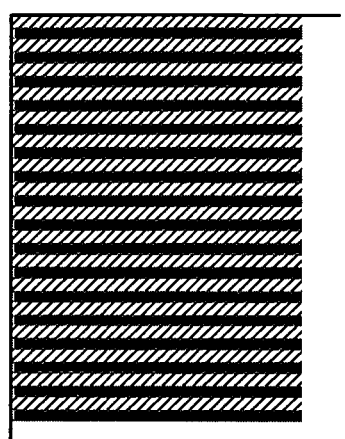
FIG. 4A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 4A shows part of an interlaced video frame (400), including the alternating lines of the top field and bottom field at the top left part of the interlaced video frame (400).

Figure 4B:
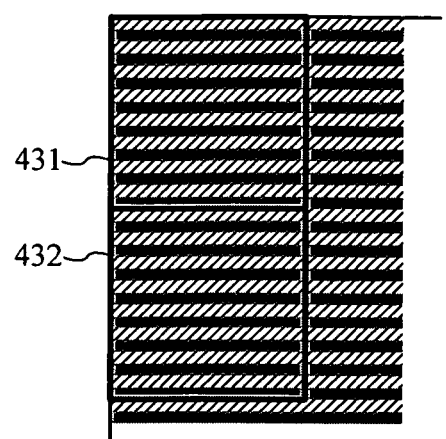
FIG. 4B is a diagram of the interlaced video frame organized for encoding/decoding as a frame.

FIG. 4B shows the interlaced video frame (400) of FIG. 4A organized for encoding/decoding as a frame (430). The interlaced video frame (400) has been partitioned into macroblocks such as the macroblocks (431) and (432), which use a 4:2:0 format. In the luminance plane, each macroblock (431, 432) includes 8 lines from the top field alternating with 8 lines from the bottom field for 16 lines total, and each line is 16 pixels long. Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P- and B-frames may include intra-coded macroblocks as well as different types of predicted macroblocks.

Figure 4C:
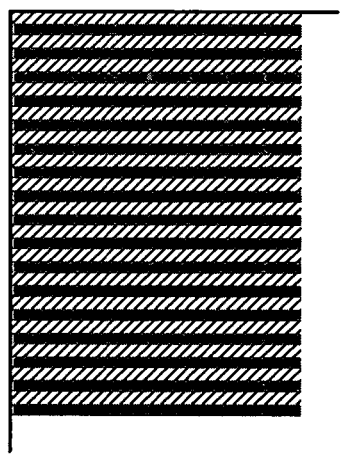
FIG. 4C is a diagram of the interlaced video frame organized for encoding/decoding as fields.
Figure 4C:
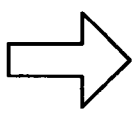
Figure 4C:
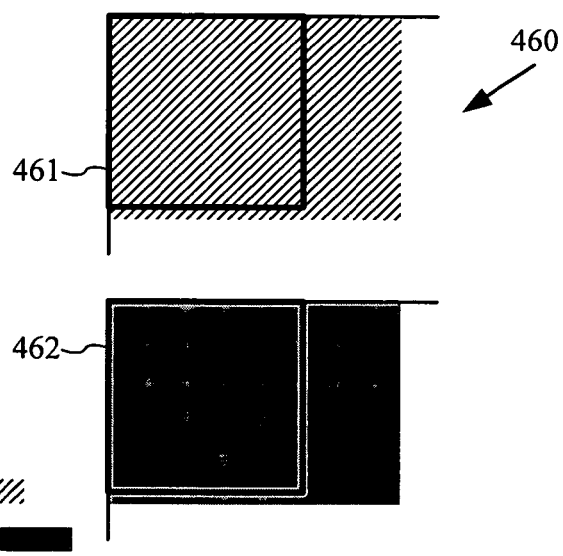

FIG. 4C shows the interlaced video frame (400) of FIG. 4A organized for encoding/decoding as fields (460). Each of the two fields of the interlaced video frame (400) is partitioned into macroblocks. The top field is partitioned into macroblocks such as the macroblock (461), and the bottom field is partitioned into macroblocks such as the macroblock (462). In the luminance plane, the macroblock (461) includes 16 lines from the top field and the macroblock (462) includes 16 lines from the bottom field, and each line is 16 pixels long. An interlaced I-field is a single, separately represented field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder (200) and decoder (300) are object-based, use a different macroblock or block format, or perform operations on sets of pixels of different size or configuration than 8×8 blocks and 16×16 macroblocks.

B. Video Encoder

FIG. 2 is a block diagram of a generalized video encoder system (200). The encoder system (200) receives a sequence of video pictures including a current picture (205) (e.g., progressive video frame, interlaced video frame, or field of an interlaced video frame), and produces compressed video information (295) as output. Particular embodiments of video encoders typically use a variation or supplemented version of the generalized encoder (200).

The encoder system (200) compresses predicted pictures and key pictures. For the sake of presentation, FIG. 2 shows a path for key pictures through the encoder system (200) and a path for forward-predicted pictures. Many of the components of the encoder system (200) are used for compressing both key pictures and predicted pictures. The exact operations performed by those components can vary depending on the type of information being compressed.

A predicted picture (also called p-picture, b-picture for bi-directional prediction, or inter-coded picture) is represented in terms of prediction (or difference) from one or more other pictures. A prediction residual is the difference between what was predicted and the original picture. In contrast, a key picture (also called an I-picture or intra-coded picture) is compressed without reference to other pictures.

If the current picture (205) is a forward-predicted picture, a motion estimator (210) estimates motion of macroblocks or other sets of pixels of the current picture (205) with respect to a reference picture, which is a reconstructed previous picture (225) buffered in the picture store (220). Or, the reference picture is a later picture or the current picture is bi-directionally predicted. The motion estimator (210) can estimate motion by pixel, ½-pixel, ¼-pixel, or other increments, and can switch the precision of the motion estimation on a picture-by-picture basis or other basis. The precision of the motion estimation can be the same or different horizontally and vertically. The motion estimator (210) outputs as side information motion information (215) such as motion vectors. A motion compensator (230) applies the motion information (215) to the reconstructed previous picture (225) to form a motion-compensated current picture (235). The prediction is rarely perfect, however, and the difference between the motion-compensated current picture (235) and the original current picture (205) is the prediction residual (245). Alternatively, a motion estimator and motion compensator apply another type of motion estimation/compensation.

A frequency transformer (260) converts the spatial domain video information into frequency domain (i.e., spectral) data. For block-based video pictures, the frequency transformer (260) applies a DCT or variant of DCT to blocks of the pixel data or prediction residual data, producing blocks of DCT coefficients. Alternatively, the frequency transformer (260) applies another conventional frequency transform such as a Fourier transform or uses wavelet or subband analysis. The frequency transformer (260) applies an 8×8, 8×4, 4×8, or other size frequency transform (e.g., DCT) to prediction residuals for predicted pictures.

A quantizer (270) then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (200) can use frame dropping, adaptive filtering, or other techniques for rate control.

If a given macroblock in a predicted picture has no information of certain types (e.g., no motion information for the macroblock and no residual information), the encoder (200) may encode the macroblock as a skipped macroblock. If so, the encoder signals the skipped macroblock in the output bitstream of compressed video information (295).

When a reconstructed current picture is needed for subsequent motion estimation/compensation, an inverse quantizer (276) performs inverse quantization on the quantized spectral data coefficients. An inverse frequency transformer (266) then performs the inverse of the operations of the frequency transformer (260), producing a reconstructed prediction residual (for a predicted picture) or reconstructed samples (for an intra-coded picture). If the picture (205) being encoded is an intra-coded picture, then the reconstructed samples form the reconstructed current picture (not shown). If the picture (205) being encoded is a predicted picture, the reconstructed prediction residual is added to the motion-compensated predictions (235) to form the reconstructed current picture. The picture store (220) buffers the reconstructed current picture for use in predicting a next picture. The encoder may apply a deblocking filter to adaptively smooth discontinuities between blocks.

The entropy coder (280) compresses the output of the quantizer (270) as well as certain side information (e.g., motion information (215), quantization step size). Typical entropy coding techniques include arithmetic coding, differential coding, Huffman coding, run length coding, LZ coding, dictionary coding, and combinations of the above. The entropy coder (280) typically uses different coding techniques for different kinds of information (e.g., DC coefficients, AC coefficients, different kinds of side information), and can choose from among multiple code tables within a particular coding technique.

The entropy coder (280) puts compressed video information (295) in the buffer (290). A buffer level indicator is fed back to bit rate adaptive modules. The compressed video information (295) is depleted from the buffer (290) at a constant or relatively constant bit rate and stored for subsequent streaming at that bit rate. Therefore, the level of the buffer (290) is primarily a function of the entropy of the filtered, quantized video information, which affects the efficiency of the entropy coding. Alternatively, the encoder system (200) streams compressed video information immediately following compression, and the level of the buffer (290) also depends on the rate at which information is depleted from the buffer (290) for transmission.

Before or after the buffer (290), the compressed video information (295) can be channel coded for transmission over the network. The channel coding can apply error detection and correction data to the compressed video information (295).

C. Video Decoder

FIG. 3 is a block diagram of a generalized video decoder system (300). The decoder system (300) receives information (395) for a compressed sequence of video pictures and produces output including a reconstructed picture (305) (e.g., progressive video frame, interlaced video frame, or field of an interlaced video frame). Particular embodiments of video decoders typically use a variation or supplemented version of the generalized decoder (300).

The decoder system (300) decompresses predicted pictures and key pictures. For the sake of presentation, FIG. 3 shows a path for key pictures through the decoder system (300) and a path for forward-predicted pictures. Many of the components of the decoder system (300) are used for decompressing both key pictures and predicted pictures. The exact operations performed by those components can vary depending on the type of information being decompressed.

A buffer (390) receives the information (395) for the compressed video sequence and makes the received information available to the entropy decoder (380). The buffer (390) typically receives the information at a rate that is fairly constant over time, and includes a jitter buffer to smooth short-term variations in bandwidth or transmission. The buffer (390) can include a playback buffer and other buffers as well. Alternatively, the buffer (390) receives information at a varying rate. Before or after the buffer (390), the compressed video information can be channel decoded and processed for error detection and correction.

The entropy decoder (380) entropy decodes entropy-coded quantized data as well as entropy-coded side information (e.g., motion information (315), quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (380) frequently uses different decoding techniques for different kinds of information (e.g., DC coefficients, AC coefficients, different kinds of side information), and can choose from among multiple code tables within a particular decoding technique.

If the picture (305) to be reconstructed is a forward-predicted picture, a motion compensator (330) applies motion information (315) to a reference picture (325) to form a prediction (335) of the picture (305) being reconstructed. For example, the motion compensator (330) uses a macroblock motion vector to find a macroblock in the reference picture (325). A picture buffer (320) stores previous reconstructed pictures for use as reference pictures. The motion compensator (330) can compensate for motion at pixel, ½-pixel, ¼-pixel, or other increments, and can switch the precision of the motion compensation on a picture-by-picture basis or other basis. The precision of the motion compensation can be the same or different horizontally and vertically. Alternatively, a motion compensator applies another type of motion compensation. The prediction by the motion compensator is rarely perfect, so the decoder (300) also reconstructs prediction residuals.

An inverse quantizer (370) inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, a non-uniform, vector, or non-adaptive inverse quantization, or directly inverse quantizes spatial domain data in a decoder system that does not use inverse frequency transformations.

An inverse frequency transformer (360) converts the quantized, frequency domain data into spatial domain video information. For block-based video pictures, the inverse frequency transformer (360) applies an IDCT or variant of IDCT to blocks of the DCT coefficients, producing pixel data or prediction residual data for key pictures or predicted pictures, respectively. Alternatively, the frequency transformer (360) applies another conventional inverse frequency transform such as a Fourier transform or uses wavelet or subband synthesis. The inverse frequency transformer (360) applies an 8×8, 8×4, 4×8, or other size inverse frequency transform (e.g., IDCT) to prediction residuals for predicted pictures.

When the decoder needs a reconstructed picture for subsequent motion compensation, the picture store (320) buffers the reconstructed picture for use in predicting a next picture. The decoder may apply a deblocking filter to adaptively smooth discontinuities between blocks.

III. Signaling Reference Frame Distances

According to one set of definitions, for interlaced video, a "current frame" is the frame that contains the field currently being coded or decoded, and a "reference frame" is a frame that contains at least one field used as a motion compensation reference for a field of the current frame.

In some embodiments, an encoder encodes and signals reference frame distance information, and a decoder performs corresponding parsing and decoding of the information. A reference frame distance indicates the distance between a current frame and the reference frame that contains the field(s) used as reference(s) for field(s) of the current frame. For example, the distance is represented in terms of the count of frames between the current frame and the reference frame. Alternatively, the reference frame distance is represented in other terms.

Typically, the intermediate frames between a current frame and its reference frame contain bi-directionally predicted fields, and the current frame contains either intra-coded or forward predicted fields. For example, each intermediate frame is some combination of interlaced B- and BI-fields (B/B, B/BI, BI/B, or BI/BI), and the current frame is some combination of interlaced I- and P-fields (I/I, I/P, P/I, or P/P). An encoder and decoder use reference frame distance information when scaling motion vectors for motion vector prediction. Alternatively, reference frame distance information is signaled for other picture types and/or used for some other purpose.

Alternatively, instead of an actual count of frames (e.g., frames with B- or BI-fields) between the current frame and the reference frame, the reference frame distance is an arbitrary value selected so as to improve the performance of subsequent operations that use the reference frame distance. In other words, the reference frame distance for a particular frame can have any value that is allowed in an implementation. For example, an encoder selects the value so as to improve the prediction accuracy of motion vectors produced by scaling operations in motion vector prediction. The selected number is often the actual count of B-frames, but it does not have to be. If using a different, notional value for reference frame distance produces better results, the encoder may choose the different value.

A. Syntax and Code Examples

Various signaling innovations help reduce the bit rate associated with signaling reference frame distance information. These may be used in combination or separately.

First, reference frame distances may be represented with variable length codes ["VLCs"]. For example, Huffman codes may be used for possible reference frame distances, with or without escape coding. Or, variable length coding and decoding can occur according to the rules shown in the table in FIG. 5. FIG. 5 shows VLCs for the syntax element REFDIST in one implementation. The last row indicates a rule for VLCs if REFDIST is greater than 2. Such a VLC is coded as (binary) 11 followed by N-3 1s, where N is the REFDIST value. The last bit in the VLC is 0. For N=3, VLC=110 and VLC Size=3, for N=4, VLC=1110 and VLC Size=4, for N=5, VLC=11110 and VLC Size=5, and so on. Alternatively, different VLCs are used to represent reference frame distance values. Or, fixed length codes ["FLCs"] are used to represent reference frame distance values.

Second, reference frame distances may be signaled for some kinds of frames but not other kinds of frames. For example, reference frame distances are signaled for frames containing forwarded-predicted fields and/or intra-coded fields but not for frames containing bi-directionally predicted fields. In the REFDIST example, REFDIST is signaled in frame headers for some kinds of field-coded interlaced video frames (namely, I/I, I/P, P/I, and P/P) but not for other kinds of field-coded interlaced video frames (namely, B/B, B/BI, BI/B, and BI/BI). Alternatively, reference frame distances are signaled according to another rule.

Third, reference frame distances may be signaled only some times for a set of frames, with a default value for reference frame distance used the rest of the time. For example, a one-bit flag or other code for a sequence, entry point segment, or other set of pictures indicates whether reference frame distances are signaled or take a default value for the set of pictures. In the REFDIST example, the one-bit syntax element REFDIST_FLAG may be signaled in the entry point header for an entry point segment. If REFDIST_FLAG has one binary value, a default value is used for the reference frame distances of frames in the entry point segment, and reference frame distance information is not signaled per frame. If REFDIST_FLAG has the other binary value, reference frame distances are signaled for frames in the entry point segment. Alternatively, no default values are used reference frame distances, and reference frame distances are always signaled.

B. Encoding

An encoder such as the encoder (200) of FIG. 2 encodes and signals reference frame distance information. For example, the encoder performs the technique (600) shown in FIG. 6A when encoding a field-coded interlaced video frame that has some combination of interlaced I-fields and P-fields. Alternatively, the encoder performs the technique (600) for some other kind of picture.

For a frame, the encoder determines (610) whether reference frame distances are currently signaled or instead take a default value. For example, the encoder checks the value of a flag previously signaled in an entry point header or sequence header, and the flag value indicates whether the encoder should signal a reference frame distance per frame or use the default value. Alternatively, the encoder makes the decision based upon other information.

If reference frame distance signaling is used, the encoder encodes and signals (620) a reference frame distance syntax element for the frame. For example, the syntax element is REFDIST and is signaled in a frame header. Alternatively, the reference frame distance syntax element is another VLC or FLC or is signaled elsewhere. If reference frame distance signaling is not used, the encoder uses (630) the default value for reference frame distance and does not encode or signal a reference frame distance syntax element for the frame.

The encoder then encodes (640) the frame (more specifically, for a field-coded interlaced video frame, it encodes the two separate interlaced fields of the frame). In the encoding, the encoder uses the reference frame distance (either signaled or default value) for operations such as scaling of motion vectors in motion vector prediction.

Figure 6A:
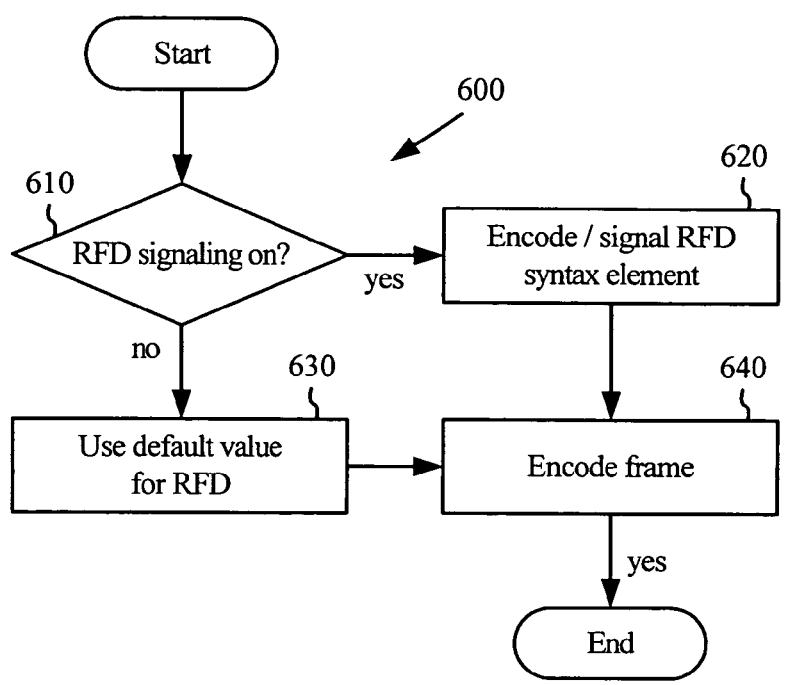
FIGS. 6A and 6B are flowcharts of techniques for encoding and decoding, respectively, of reference frame distance information.

FIG. 6A shows encoding and signaling of reference frame distance for a single frame. The technique (600) repeats for other frames that have reference frame distances. Certain kinds of frames (e.g., those containing bi-directionally predicted fields) may not have a reference frame distance explicitly signaled, but may derive reference frame distances from the reference frame distances of their anchor frames. From time to time (e.g., at a new entry point), the signaling/default decision (610) may change, with the encoder signaling the change with a flag or other syntax element, or with the encoder and decoder making the change based upon other information available to both the encoder and decoder. For the sake of simplicity, FIG. 6A does not show the various ways in which the technique (600) may be integrated with other aspects of encoding and decoding.

C. Decoding

A decoder such as the decoder (300) of FIG. 3 parses and decodes reference frame distance information. For example, the decoder performs the technique (650) shown in FIG. 6B when decoding a field-coded interlaced video frame that has some combination of interlaced I-fields and P-fields. Alternatively, the decoder performs the technique (650) for some other kind of picture.

For a frame, the decoder determines (660) whether reference frame distances are currently signaled or instead take a default value. For example, the decoder checks the value of a flag previously parsed from an entry point header or sequence header, and the flag value indicates whether the decoder should parse a reference frame distance per frame or use the default value. Alternatively, the decoder makes the decision based upon other information.

If reference frame distance signaling is used, the decoder parses and decodes (670) a reference frame distance syntax element for the frame. For example, the syntax element is REFDIST and is signaled in a frame header. Alternatively, the reference frame distance syntax element is another VLC or FLC or is signaled elsewhere. If reference frame distance signaling is not used, the decoder uses (680) the default value for reference frame distance and does not parse or decode a reference frame distance syntax element for the frame.

The decoder then decodes (690) the frame (more specifically, for a field-coded interlaced video frame, it decodes the two separate interlaced fields of the frame). In the decoding, the decoder uses the reference frame distance (either signaled or default value) for operations such as scaling of motion vectors in motion vector prediction.

Figure 6B:
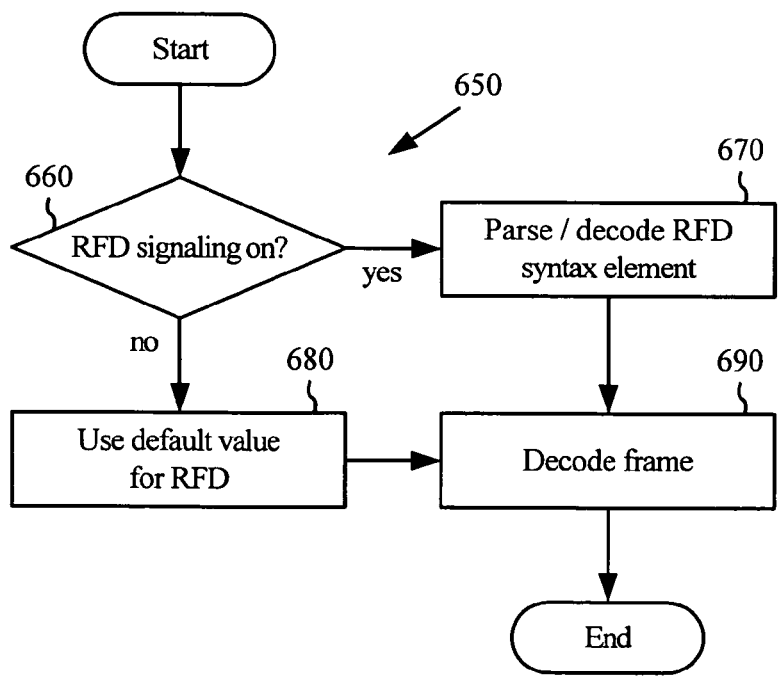

FIG. 6B shows parsing and decoding of reference frame distance for a single frame. The technique (650) repeats for other frames that have reference frame distances. Certain kinds of frames (e.g., those containing bi-directionally predicted fields) may not have a reference frame distance explicitly signaled, but may derive reference frame distances from the reference frame distances of their anchor frames. From time to time (e.g., at a new entry point), the signaling/default decision (660) may change, with the decoder parsing and decoding a flag or other syntax element indicating the change, or with the encoder and decoder making the change based upon other information available to both the encoder and decoder. For the sake of simplicity, FIG. 6B does not show the various ways in which the technique (650) may be integrated with other aspects of encoding and decoding.

IV. Combined Implementation

Syntax, semantics, and decoding are now described for one detailed combined implementation. Alternatively, the above-described techniques are used in conjunction with other implementations having different syntax, semantics, and decoding.

Figure 7A:
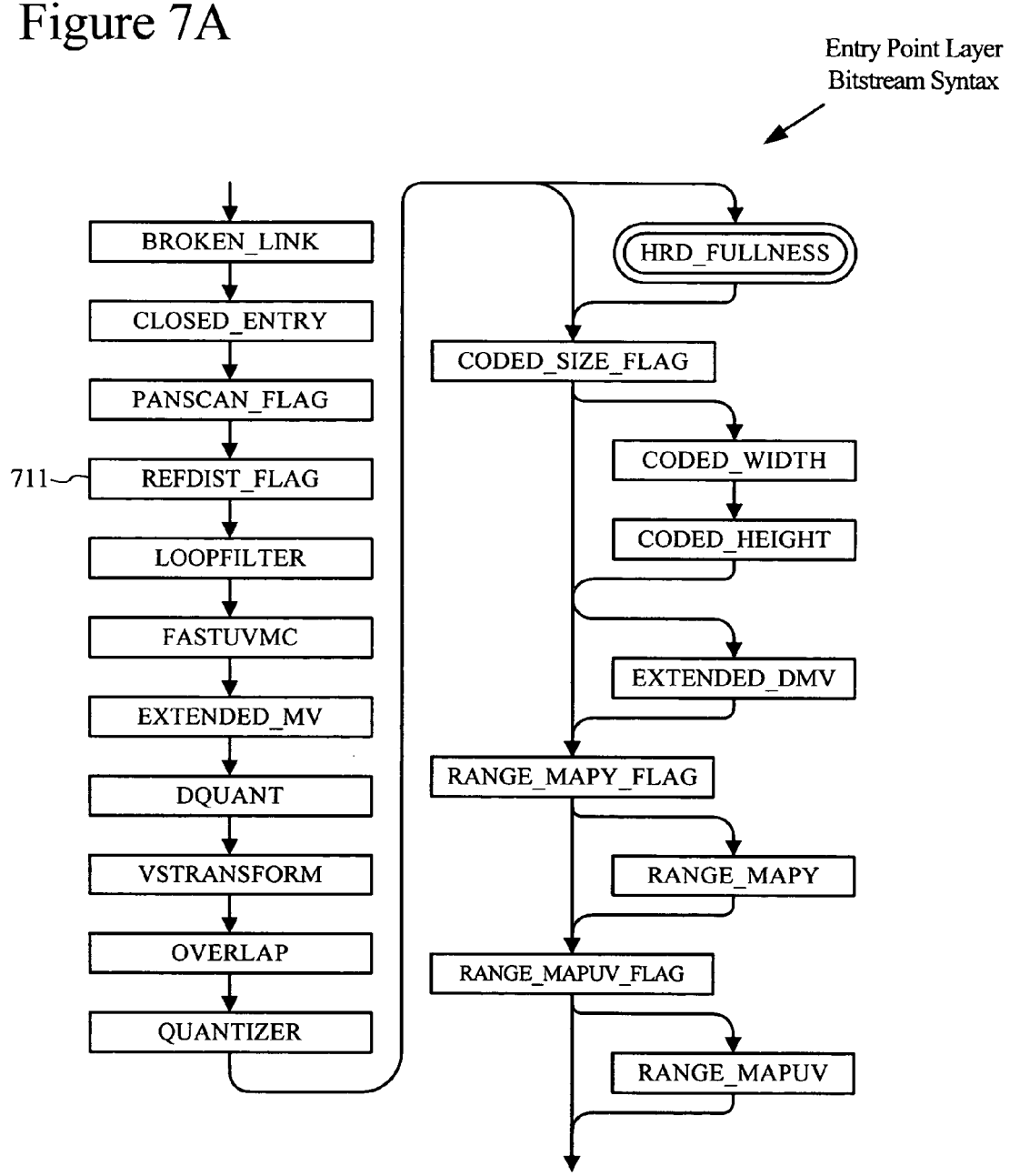
FIGS. 7A and 7B are syntax diagrams for layers of a bitstream according to a combined implementation.
Figure 7B:
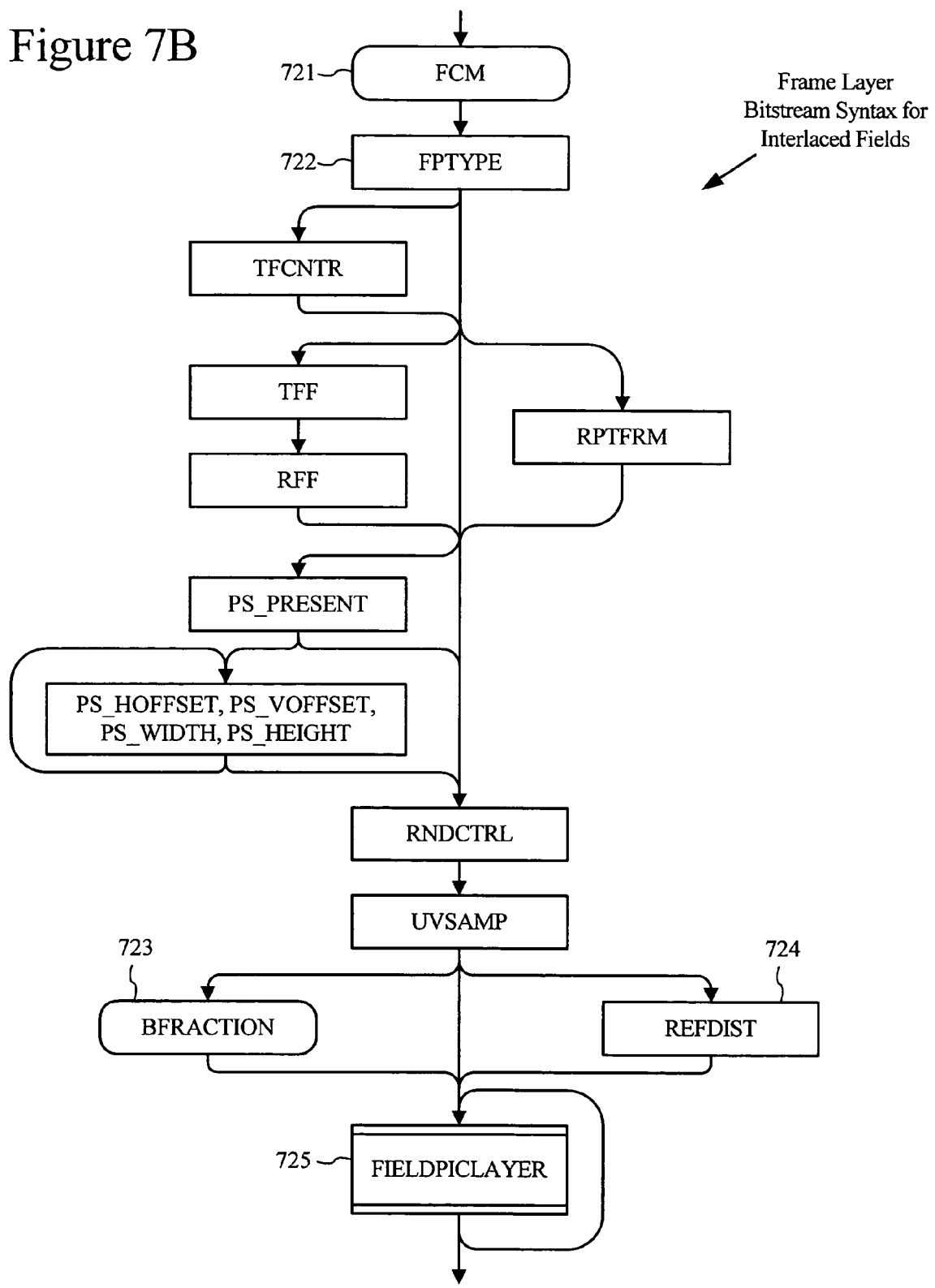

A compressed video sequence is made up of data structured into hierarchical layers: the picture layer, macroblock layer, and block layer. A sequence layer precedes the sequence, and entry point layers may be interspersed in the sequence. FIGS. 7A and 7B show bitstream elements that make up various layers.

A. Bitstream Syntax, Semantics, and Decoding for REFDIST

A sequence-level header contains sequence-level parameters used to decode the sequence of compressed pictures. In some profiles, sequence-related metadata is communicated to the decoder by the transport layer or other means. For the profile with field-coded interlaced video frames (the advanced profile), however, this header syntax is part of the video data bitstream. In the sequence layer, the PROFILE and LEVEL elements specify the profile used to encode the sequence and the encoding level in the profile, respectively. The INTERLACE element is a one-bit syntax element that signals whether the source content is progressive (INTERLACE=0) or interlaced (INTERLACE=1). The individual frames may still be coded using the progressive or interlaced syntax when INTERLACE=1.

An entry-point header may be present in the advanced profile. An entry point has two purposes. First, it is used to signal a random access point within the bitstream. Second, it is used to signal changes in the coding control parameters. FIG. 7A shows the syntax elements that make up the entry-point layer. Of particular interest, the reference frame distance flag REFDIST_FLAG (711) element is a one-bit syntax element. REFDIST_FLAG=1 indicates that the REFDIST (724) element is present in I/I, I/P, P/I or P/P field picture headers. REFDIST_FLAG=0 indicates that the REFDIST (724) element is not present in I/I, I/P, P/I or P/P field picture headers.

Data for a picture consists of a picture header followed by data for the macroblock layer. FIG. 7B shows the bitstream elements that make up the frame header for interlaced field pictures. The header shown in FIG. 7B is applicable to various combinations of interlaced I-, P-, B-, and BI-fields.

The frame coding mode FCM (721) element is present only in the advanced profile and only if INTERLACE has the value 1. FCM (721) indicates whether a frame is coded as progressive, field-interlaced (i.e., two interlaced fields), or frame-interlaced. The table in FIG. 8A includes the VLCs for FCM (721). B-pictures are constrained to be the same type (i.e., progressive, field-interlaced or frame-interlace) as the first anchor frame that comes after them temporally. In other words, a B-picture is the same frame coding mode as the backward reference picture for that B-picture.

The field picture type FPTYPE (722) element is a three-bit syntax element present in picture headers for interlaced field pictures. FPTYPE is decoded according to the table in FIG. 8B. A field-coded interlaced frame may include two interlaced I-fields, an interlaced I-field followed by an interlaced P-field, an interlaced P-field followed by an interlaced I-field, two interlaced P-fields, two interlaced B-fields, an interlaced B-field followed by an interlaced BI-field, an interlaced BI-field followed by an interlaced B-field, or two interlaced BI-fields.

The reference distance REFDIST (724) element is a variable-size syntax element present in interlaced field picture headers if the entry-level flag REFDIST_FLAG is 1 and if the picture type is not B/B, B/BI, BI/B, or BI/BI. If REFDIST_FLAG is 0, REFDIST (724) is given the default value of 0. REFDIST (724) indicates the number of frames between the current frame (that includes the two separately coded fields) and the previous reference frame. The table in FIG. 5 includes VLCs used for REFDIST (724). The value of REFDIST (724) is less than or equal to 16.

BFRACTION (723) is a variable-sized syntax element present in headers for B/B, B/BI, and BI/B frames. BFRACTION (723) signals one of a limited set of fractional values between 0 and 1, denoting the relative temporal position of the B-frame within the interval formed by its anchors. The mapping of BFRACTION (723) is shown in the table in FIG. 8C. The codeword 1111110 is unused. For the simple and main profiles, the codeword 1111111 indicates that the B-frame is a BI-frame. For the advanced profile, 1111111 is invalid since this case is coded using another element.

The field picture layer FIELDPICLAYER (725) element is data for one of the separate interlaced fields of the frame. For a P/P frame, for example, the bitstream includes two FIELDPICLAYER (725) elements for the two interlaced P-fields. The syntax and semantics of the field picture layer (and macroblock, block, and sub-block layers) vary depending on picture type. For additional detail on example syntax and semantics, see U.S. Provisional Patent Application No. 60/501,081.

B. Uses of REFDIST

REFDIST (724) is used for various motion vector scaling operations in motion vector prediction for interlaced P-fields and interlaced B-fields. A brief description of example uses of reference frame distance is provided for the sake of completeness.

1. Motion Vector Prediction for Interlaced P-fields

An interlaced P-field may refer to the two most recent reference fields. For a current, two-reference field interlaced P-field, two motion vector predictors may be computed for each motion vector. One motion vector predictor is from the reference field of the same polarity as the current P-field, and the other motion vector predictor is from the reference field with the opposite polarity.

The pseudocode in FIGS. 9A through 9E illustrates a process of calculating the motion vector predictor for a motion vector. The motion vector values for neighbors A, B, and C depend on the location of the current macroblock or block and whether the neighbors are macroblocks or blocks, as described in U.S. patent application Ser. No. 10/934,905. The variables samefieldpred_x and samefieldpred_y represent the horizontal and vertical components of the motion vector predictor from the same polarity field, and the variables oppositefieldpred_x and oppositefieldpred_y represent the horizontal and vertical components of the motion vector predictor from the opposite polarity field. The variable dominant predictor indicates which field contains the dominant predictor.

The pseudocode in FIGS. 9F and 9G shows the various scaling operations used to derive another field's motion vector predictor. The values of variables are shown in FIG. 9H for the case where the current field is the first field and in FIG. 9I for the case where the current field is the second field. The variables change depending on reference frame distance because the appropriate scaling factor changes for different distances between the current field and the reference fields.

For example, if REFDIST is 0 (no intermediate B-frames), the distance between the same polarity reference field and the current field is double the distance between the opposite polarity reference field and the current field. So, horizontal scaling from an opposite polarity motion vector predictor to a same polarity motion vector predictor basically results in a doubling, and horizontal scaling from same to opposite basically results in a halving. The vertical scaling also accounts for interlacing offsets. If REFDIST is 1 (one intermediate B-frame), however, the relative distances between the current field and the respective reference fields change, and the scaling factors change accordingly. For example, the distance is three fields from a current, top field to the opposite polarity reference field and four fields from the current, top field to the same polarity reference field.

For additional detail about these motion vector scaling operations and other motion vector scaling operations for interlaced P-fields that use REFDIST (724), see, e.g., U.S. patent application Ser. No. 10/934,905.

2. Motion Vector Prediction for Interlaced B-fields

As another example of the use of REFDIST (724), an interlaced B-field refers to up to two reference fields for forward prediction and two reference fields for backward prediction. Forward motion vector prediction for a B-field is basically the same as P-field motion vector prediction as described above, but does have a few differences. The reference frame distance is derived from BFRACTION (723) in the B-field's frame header and the REFDIST (724) element in the backward reference frame header. The forward reference frame distance ["FRFD"] for the B-field is computed as: FRFD=NINT((BFRACTION numerator/BFRACTION denominator)*Reference Frame Distance)−1. If FRFD<0, then FRFD=0. NINT is the nearest integer operator, and the BFRACTION numerator and BFRACTION denominator are derived from BFRACTION (723). Reference Frame Distance is computed from REFDIST (724) of the backward reference frame as REFDIST+1.

Backward motion vector prediction for the second B-field in an interlaced frame is basically the same as P-field motion vector prediction as described above.

Backward motion vector prediction for the first B-field in an interlaced frame is also basically the same as P-field motion vector prediction, but the motion vector scaling is different. For this case, scaleforopposite_x, scaleforopposite_y, scaleforsame_x and scaleforsame_y are defined as shown in FIGS. 10A and 10B. The values of variables are shown in FIG. 10C.

Backward reference frame distance is computed from BFRACTION (723) in the B-field's frame header and REFDIST (724) in the backward reference frame header. The backward reference frame distance ["BRFD"] is computed as: BRFD=Reference Frame Distance−FRFD−1. Reference Frame Distance is computed from REFDIST (724) of the backward reference frame as REFDIST+1.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In various embodiments, an encoder and decoder use flags and/or signals in a bitstream. While specific flags and signals are described, it should be understood that this manner of description encompasses different conventions (e.g., 0s rather than 1s) for the flags and signals.

In view of the many possible embodiments to which the principles of our invention may be applied, we claim as our invention all such embodiments as may come within the scope and spirit of the following claims and equivalents thereto.

We claim:

1. A computer-implemented method for transforming encoded video information using a video decoder, the method comprising:

receiving, at the video decoder, encoded video information in a bitstream;

with the video decoder, parsing, from the encoded video information, a first code, wherein the first code is signaled at entry-point level for plural pictures, wherein the first code indicates whether reference frame distances for the plural pictures are signaled at picture level in the bitstream or have a default value and are not signaled in the bitstream, and wherein reference frame distance indicates a count of frames between a current video frame and a preceding reference frame; and with the video decoder, for each picture of the plural pictures:

parsing, from the encoded video information, a second code, wherein the second code indicates a frame coding mode of the picture, and wherein the picture is a current field-coded interlaced video frame;

parsing, from the encoded video information, a third code, wherein the third code indicates a field picture type of the picture;

if the first code indicates that reference frame distances are signaled and if the third code indicates a field picture type of I/I, I/P, P/I, or P/P, then parsing, from the encoded video information, a fourth code for a reference frame distance for the current field-coded interlaced video frame, wherein the fourth code is a variable length code, and wherein the fourth code uses a 2-bit codeword to represent reference frame distance values of zero, one, and two, and uses an N-bit unary codeword to represent reference frame distance values from three, where N=3, to sixteen, where N=16;

if the first code indicates that reference frame distances have a default value and are not signaled in the bitstream, then using the default value for the reference frame distance for the current field-coded interlaced video frame, wherein the default value is zero; and decoding the current field-coded interlaced video frame, including, for a given motion vector of a current block or macroblock of the current field-coded interlaced video frame:

computing a motion vector predictor using motion vector values of plural neighbor blocks or macroblocks in the current field-coded interlaced video frame, including scaling at least one of the motion vector values of the plural neighbor blocks or macroblocks according to a scaling factor that varies depending on the reference frame distance for the current field-coded interlaced video frame; and reconstructing the given motion vector of the current block or macroblock using the motion vector predictor and motion vector differential information.

2. The method of claim 1 wherein the count is a count of bi-directionally predicted field-coded interlaced video frames between the current field-coded interlaced video frame and the preceding reference frame.

3. The method of claim 1 wherein the count is an arbitrary value selected so as to improve performance of operations that are based at least in part upon the count.

4. The method of claim 1 wherein the fourth code is signaled in a frame header for the current field-coded interlaced video frame.

5. The method of claim 1 wherein the current field-coded interlaced video frame includes at least one interlaced P-field.

6. The method of claim 1 wherein the motion vector predictor is one of plural motion vector predictors computed for the given motion vector, the plural motion vector predictors including a same field motion vector predictor and an opposite field motion vector predictor, and wherein the decoding further includes, for the given motion vector, selecting one of the plural motion vector predictors to use in reconstructing the given motion vector.

7. A computer-implemented method for transforming encoded video information using a video decoder, the method comprising:

receiving, at the video decoder, encoded video information in a bitstream;

with the video decoder, parsing, from the encoded video information, a first syntax element that indicates whether reference frame distances for plural frames are signaled in the bitstream for individual frames of the plural frames or have a default value and are not signaled in the bitstream, wherein the first syntax element is signaled at entry-point level, as part of an entry point header, for an entry point segment that includes the plural frames, and wherein reference frame distance indicates a number of frames between a current frame and a reference frame; and with the video decoder, for each of the plural frames, parsing, from the encoded video information, a second syntax element, wherein the second syntax element indicates a field picture type per frame;

if reference frame distances are signaled, and if and only if the second syntax element indicates a field picture type of I/I, I/P, P/I, or P/P, then parsing, from the encoded video information, a third syntax element per frame that indicates a reference frame distance for the frame, wherein the third syntax element is a variable length code, and wherein the third syntax element uses a 2-bit codeword to represent reference frame distance values of zero, one, and two, and uses an N-bit unary codeword to represent reference frame distance values from three, where N=3, to sixteen, where N=16, otherwise, if reference frame distances have the default value and are not signaled in the bitstream, then using the default value for the reference frame distance for the frame, wherein the default value is zero; and decoding the frame, including, for a given motion vector of a current block or macroblock of the frame:

computing a motion vector predictor using motion vector values of plural neighbor blocks or macroblocks in the frame, including scaling at least one of the motion vector values of the plural neighbor blocks or macroblocks according to a scaling factor that varies depending on the reference frame distance for the frame; and reconstructing the given motion vector of the current block or macroblock using the motion vector predictor and motion vector differential information.

8. The method of claim 7 wherein, for each of the plural frames, the reference frame distance for the frame indicates a count of bi-directionally predicted frames between the frame and a preceding reference frame.

9. The method of claim 7 wherein, for each of the plural frames, the reference frame distance for the frame is an arbitrary value selected so as to improve performance of operations that are based at least in part upon the reference frame distance.

10. The method of claim 7 wherein each of the plural frames is a field-coded interlaced video frame that is not bi-directionally predicted.

11. The method of claim 7 wherein, if reference frame distances are signaled, the third syntax element per frame is part of a frame header for the frame.

12. The method of claim 7 wherein the motion vector predictor is one of plural motion vector predictors computed for the given motion vector, the plural motion vector predictors including a same field motion vector predictor and an opposite field motion vector predictor, and wherein the decoding further includes, for the given motion vector, selecting one of the plural motion vector predictors to use in reconstructing the given motion vector.

13. A video decoder comprising:

means for buffering a coded video bitstream;

means for decoding a first code, wherein the first code is signaled at entry-point level for plural pictures, and wherein the first code indicates whether reference frame distances for the plural pictures are signaled at picture level in the coded video bitstream or have a default value and are not signaled in the coded video bitstream, and wherein reference frame distance indicates a count of bi-directionally predicted frames between a current video frame and a preceding reference frame; and means for, for each picture of the plural pictures:

decoding a second code, wherein the second code indicates a frame coding mode of the picture, wherein the picture is a current frame;

decoding a third code, wherein the third code indicates a field picture type of the picture;

if the first code indicates that reference frame distances are signaled and if the third code indicates a field picture type of I/I, I/P, P/I, or P/P, decoding a fourth code for a reference frame distance for the current frame, wherein the fourth code is a variable length code, and wherein the fourth code uses a 2-bit codeword to represent reference frame distance values of zero, one, and two, and uses an N-bit unary codeword to represent reference frame distance values from three, where N=3, to sixteen, where N=16; and otherwise, if the first code indicates that reference frame distances have a default value and are not signaled in the bitstream, then using the default value for the reference frame distance for the current frame, wherein the default value is zero; and decoding the current frame, including, for a given motion vector of a current block or macroblock of the current frame:

computing a motion vector predictor using motion vector values of plural neighbor blocks or macroblocks in the current frame, including scaling at least one of the motion vector values of the plural neighbor blocks or macroblocks according to a scaling factor that varies depending on the reference frame distance for the current frame; and reconstructing the given motion vector of the current block or macroblock using the motion vector predictor and motion vector differential information.

14. The decoder of claim 13 wherein the fourth code is signaled in a frame header for the current frame.

15. A computer-implemented method for transforming video information using a video encoder, the method comprising:

determining, at the video encoder, whether reference frame distances for plural pictures will be signaled or will have a default value, wherein the default value is zero;

if reference frame distances will be signaled for the plural pictures then, with the video encoder, signaling, in a bitstream, a first code indicating that reference frame distances are signaled at picture level in the bitstream for the plural pictures, wherein the first code is signaled at entry-point level for the plural pictures, and wherein reference frame distance indicates a count of frames between a current video frame and a preceding reference frame; and with the video encoder, for each picture of the plural pictures:

signaling, in the bitstream, a second code, wherein the second code indicates a frame coding mode of the picture, and wherein the picture is a current field-coded interlaced video frame;

signaling, in the bitstream, a third code, wherein the third code indicates a field picture type of the picture;

if the first code indicates that reference frame distances are signaled and if the third code indicates a field picture type of I/I, I/P, P/I, or P/P, then signaling, in the bitstream, a fourth code for a reference frame distance for the current field-coded interlaced video frame, wherein the fourth code is a variable length code, and wherein the fourth code uses a 2-bit codeword to represent reference frame distance values of zero, one, and two, and uses an N-bit unary codeword to represent reference frame distance values from three, where N=3, to sixteen, where N=16;

otherwise, if the first code indicates that reference frame distances will have a default value and are not signaled in the bitstream, then skipping the signaling the fourth code; and encoding motion vector information for the current field-coded interlaced video frame, including, for a given motion vector of a current block or macroblock of the current field-coded interlaced video frame:

computing a motion vector predictor using motion vector values of plural neighbor blocks or macroblocks in the current field-coded interlaced video frame, including scaling at least one of the motion vector values of the plural neighbor blocks or macroblocks according to a scaling factor that varies depending on the reference frame distance for the current field-coded interlaced video frame;

determining motion vector differential information using the motion vector predictor and the given motion vector of the current block or macroblock; and encoding and signaling the motion vector differential information.

16. The method of claim 15 wherein the count is a count of bi-directionally predicted field-coded interlaced video frames between the current field-coded interlaced video frame and the preceding reference frame.

17. The method of claim 15 wherein the count is an arbitrary value selected so as to improve performance of operations that are based at least in part upon the count.

18. The method of claim 15 wherein the fourth code is signaled in a frame header for the current field-coded interlaced video frame.

19. The method of claim 15 wherein the current field-coded interlaced video frame includes at least one interlaced P-field.

* * * * *